United States Patent
Hardin

(10) Patent No.: US 9,866,892 B2
(45) Date of Patent: *Jan. 9, 2018

(54) IR PAIRING FOR RF4CE REMOTE CONTROLS

(71) Applicant: Time Warner Cable Enterprises LLC, New York, NY (US)

(72) Inventor: Glen Hardin, Charlotte, NC (US)

(73) Assignee: Time Warner Cable Enterprises LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,069

(22) Filed: Jan. 8, 2016

(65) Prior Publication Data

US 2016/0198211 A1 Jul. 7, 2016

Related U.S. Application Data

(63) Continuation of application No. 13/896,696, filed on May 17, 2013, now Pat. No. 9,258,508.

(Continued)

(51) Int. Cl.

| | |
|---|---|
| G05B 11/01 | (2006.01) |
| G08C 19/16 | (2006.01) |
| H04N 21/422 | (2011.01) |
| H04N 5/44 | (2011.01) |
| G08C 17/02 | (2006.01) |
| G08C 23/04 | (2006.01) |
| H04N 21/426 | (2011.01) |
| H04N 21/436 | (2011.01) |
| H04N 21/654 | (2011.01) |
| H04N 21/658 | (2011.01) |
| H04N 21/81 | (2011.01) |

(52) U.S. Cl.
CPC ....... *H04N 21/42226* (2013.01); *G08C 17/02* (2013.01); *G08C 23/04* (2013.01); *H04N 5/44* (2013.01); *H04N 21/4221* (2013.01); *H04N 21/42207* (2013.01); *H04N 21/42208* (2013.01); *H04N 21/42221* (2013.01); *H04N 21/42684* (2013.01); *H04N 21/43615* (2013.01); *H04N 21/654* (2013.01); *H04N 21/6581* (2013.01); *H04N 21/8186* (2013.01); *G08C 2201/20* (2013.01)

(58) Field of Classification Search
None
See application file for complete search history.

(56) References Cited

U.S. PATENT DOCUMENTS

| | | |
|---|---|---|
| 7,769,370 B2 | 8/2010 | Du Breuil et al. |
| 8,736,427 B2 | 5/2014 | King |

(Continued)

*Primary Examiner* — Eric M Blount
(74) *Attorney, Agent, or Firm* — Chapin IP Law, LLC

(57) ABSTRACT

Systems, apparatus, and methods for pairing information appliance devices, such as set-top boxes and/or set-back boxes (the "set-top/back boxes"), to wireless remote control devices. The systems, apparatus, and methods allow the pairing between a set-top/back box and a remote control device to be made to be stateless, thereby facilitating the arbitration of subsequent pairings of the remote control device with one or more set-top/back boxes on a communications network, by a server computer communicably coupled to the respective set-top/back boxes over the communications network.

40 Claims, 5 Drawing Sheets

Related U.S. Application Data

(60) Provisional application No. 61/792,447, filed on Mar. 15, 2013.

(56) References Cited

U.S. PATENT DOCUMENTS

| | | | |
|---|---|---|---|
| 2001/0010503 A1 | 8/2001 | Darbee et al. | |
| 2005/0162282 A1* | 7/2005 | Dresti | G05B 15/02 340/12.3 |
| 2007/0080823 A1* | 4/2007 | Fu | G08C 23/04 340/4.3 |
| 2009/0195407 A1* | 8/2009 | Nakano | H04N 5/4403 340/12.23 |
| 2010/0315279 A1* | 12/2010 | Hamai | G08C 17/02 341/176 |
| 2012/0021684 A1 | 1/2012 | Schultz et al. | |
| 2013/0070154 A1* | 3/2013 | Ahn | H04N 21/42204 348/569 |
| 2014/0273844 A1* | 9/2014 | Castillo | H04B 7/2612 455/41.2 |
| 2015/0065119 A1 | 3/2015 | De Clercq et al. | |

* cited by examiner

IR PAIRING FOR RF4CE REMOTE CONTROLS

CROSS-REFERENCE TO RELATED APPLICATIONS

This application is a continuation of U.S. patent application Ser. No. 13/896,696 filed May 17, 2013 entitled IR PAIRING FOR RF4CE REMOTE CONTROLS, which claims benefit of the priority of U.S. Provisional Patent Application No. 61/792,447 filed Mar. 15, 2013 entitled IR INITIATED PAIRING.

BACKGROUND

Content service providers, such as cable television (CATV) service providers, typically provide their customers with one or more set-top boxes and/or set-back boxes for connection to their home television sets or other display devices. A set-top box or set-back box (the "set-top/back box") is defined herein as an information appliance device that can be connected between a television set or other display device and an external signal source for converting signals carried on one or more channels into content that is displayable on the television set or other display device. Whereas a set-top box is typically located on top of or below a television set or other display device, a set-back box generally has a smaller form factor that allows it to be mounted to the back of the television set/display device and hidden from view. The set-top/back boxes can each be connected to a respective one of the television sets/display devices, which may be located in the same rooms or different rooms of the customers' homes.

Such content service providers typically further provide a separate remote control device for controlling each set-top/back box provided to their customers. Each remote control device can be programmed to control a specific set-top/back box. Alternatively, a single remote control device can be programmed to control multiple set-top/back boxes. To program a remote control device to control a respective set-top/back box, a customer typically operates the remote control device, causing it to send a pairing signal to the set-top/back box. Upon receipt of the pairing signal, the set-top/back box can perform a pairing procedure with the remote control device, configuring itself to receive and accept subsequent control signals (also referred to herein as "commands") from the remote control device, such as commands to turn the set-top/back box "on" and "off", to change channels on the set-top/back box, to access special features provided by the set-top/back box, etc. The control signals transmitted by the remote control device can be line-of-sight control signals such as infrared (IR) control signals, and/or non-line-of-sight control signals such as radio frequency (RF) control signals. Once the pairing procedure is completed, the customer can use the remote control device to control only that particular set-top/back box to which it has been paired.

However, conventional set-top/back boxes, remote control devices, and processes for pairing set-top/back boxes to remote control devices have several drawbacks. For example, while pairing a set-top/back box to a remote control device, a customer may be required to press one or more specified pushbutton sequences on the remote control device and/or input one or more specified numerical codes to the remote control device, making the process of pairing the set-top/back box to the remote control device complicated and confusing for the customer. Further, one or more of the customer's remote control devices may at times become lost or misplaced, requiring the customer to replace the remote control device(s) and repeat the complicated and confusing pairing process with the replacement device(s). Moreover, because the customer may have been provided with several remote control devices for controlling multiple set-top/back boxes in his or her home, incorrect pairings of the set-top/back boxes to the respective remote control devices may result in one or more of the remote control devices controlling the wrong set-top/back box or boxes located in either the same room or different rooms, depending on whether line-of-sight IR control signals or non-line-of-sight RF control signals are employed by the respective remote control devices.

BRIEF DESCRIPTION OF EMBODIMENTS

In accordance with the present application, systems, apparatus, and methods are disclosed for pairing information appliance devices, such as set-top boxes and/or set-back boxes (the "set-top/back boxes"), to wireless remote control devices. In a first aspect, a system for pairing information appliance devices to wireless remote control devices includes at least one set-top/back box, at least one television set or other display device communicably coupled to the respective set-top/back box, and at least one remote control device. The remote control device is operative to transmit and/or receive line-of-sight control signals such as infrared (IR) control signals, and non-line-of-sight control signals such as radio frequency (RF) control signals, for use in pairing the set-top/back box to the respective remote control device, as well as controlling the television set/display device, and the set-top/back box to which the respective remote control device has been paired.

In a first exemplary mode of operation, a remote control device can be programmed to control a set-top/back box as follows. In this first mode of operation, a television set or other display device is communicably coupled to the set-top/back box. Further, at least one pushbutton on the remote control device is programmed as a macro pushbutton for performing one or more functions/commands that would typically otherwise require the actuation of several pushbuttons on the remote control device. In addition, prior to the programming of the remote control device, it is assumed that the set-top/back box is unpaired with the remote control device.

In accordance with the first exemplary mode of operation, a user can manually turn-on the set-top/back box, and establish a line-of-sight between the remote control device and the set-top/back box. The user can then press or otherwise actuate a specified macro pushbutton, such as an ON/OFF pushbutton or any other suitable pushbutton, on the remote control device, and hold down the specified macro pushbutton for at least a predetermined period of time (e.g., 5 seconds), causing the remote control device to transmit, to the set-top/back box, a line-of-sight pair request signal carrying RF pairing information, including an identification code that uniquely identifies the remote control device to the set-top/back box. In response to the pair request signal, the set-top/back box initiates a pairing procedure with the remote control device, using the RF pairing information carried by the pair request signal, thereby configuring itself to receive and accept subsequent control signals (also referred to herein as "commands") from the remote control device, which is identified by the identification code included in the RF pairing information.

Once the set-top/back box is configured to receive/accept control signals/commands from the remote control device, the set-top/back box stores the RF pairing information in its internal memory, and transmits an RF pair response signal to the remote control device, including a predetermined pairing success code to confirm that it is now paired to the remote control device, thereby completing the initial pairing procedure. In an exemplary aspect, upon the specified macro pushbutton having been held down or otherwise actuated for the predetermined period of time, the remote control device automatically programs the ON/OFF pushbutton on the remote control device for transmitting at least one first line-of-sight macro control signal, as further described below. Having initially paired the set-top/back box to the remote control device, the user can then manually turn-off the set-top/back box.

In further accordance with the first exemplary mode of operation, the user again establishes a line-of-sight between the remote control device and the set-top/back box, as well as a line-of-sight between the remote control device and the television set/display device communicably coupled to the set-top/back box. The user then presses or otherwise actuates the ON/OFF pushbutton on the remote control device, causing the remote control device to transmit the first line-of-sight macro control signal, such as a first IR macro control signal, to the set-top/back box and the television set/display device. In an exemplary aspect, the first IR macro control signal includes one or more power-on commands, such as a first power-on command for turning-on the set-top/back box and a second power-on command for turning-on the television set/display device, and a pair request signal. In this exemplary aspect, the pair request signal carries RF pairing information, including the identification code that uniquely identifies the remote control device to the set-top/back box.

Upon the user's pressing of the ON/OFF pushbutton on the remote control device, the remote control device transmits the first IR macro control signal along the established lines-of-sight to the set-top/back box and television set/display device, respectively. In response to the first and second power-on commands included in the first IR macro control signal, the respective set-top/back box and television set/display device are turned-on. Further, in response to the pair request signal included in the first IR macro control signal, the set-top/back box initiates a pairing procedure with the remote control device. In an exemplary aspect, the pairing procedure includes determining whether or not the RF pairing information included in the pair request signal already exists in the set-top/back box's internal memory. If the set-top/back box determines that the RF pairing information already exists in its internal memory, then the set-top/back box can terminate the pairing procedure, and use the RF pairing information in its internal memory, as needed, to configure itself to receive and accept subsequent control signals (commands) from the remote control device. Otherwise, if the set-top/back box determines that the RF pairing information does not exist in its internal memory, then the set-top/back box can proceed with the pairing procedure, using the newly received RF pairing information to configure itself to receive and accept subsequent control signals (commands) from the remote control device, which is identified by the identification code included in the RF pairing information.

Having been paired to the remote control device, the set-top/back box is now operative to receive and accept IR and/or RF control signals/commands from that particular remote control device, such as IR/RF commands to turn the set-top/back box "on" and "off", to change channels on the set-top/back box, to access special features provided by the set-top/back box, etc. In addition, the television set/display device is operative to receive further IR control signals/commands from the remote control device, such as IR commands to turn the television set/display device "on" and "off", to raise, lower, and/or mute the volume of the television set/display device, etc.

At a desirable time, the user can again press the ON/OFF pushbutton on the remote control device, causing the remote control device to transmit at least one second line-of-sight macro control signal, such as a second IR macro control signal, to the set-top/back box and the television set/display device. In an exemplary aspect, the second IR macro control signal includes one or more power-off commands, such as a first power-off command for turning-off the set-top/back box and a second power-off command for turning-off the television set/display device, and an unpair request signal. In this exemplary aspect, the unpair request signal carries the RF pairing information that includes the identification code for the remote control device.

Upon the user's pressing of the ON/OFF pushbutton on the remote control device, the remote control device transmits the second IR macro control signal along the established lines-of-sight to the set-top/back box and television set/display device, respectively. In response to the first and second power-off commands included in the second IR macro control signal, the respective set-top/back box and television set/display device are turned-off. Further, in response to the unpair request signal included in the second IR macro control signal, the set-top/back box initiates an unpairing procedure with the remote control device. In an exemplary aspect, the unpairing procedure includes breaking the pairing between the set-top/back box and the remote control device, while maintaining the RF pairing information in the set-top/back box's internal memory. In this way, the pairing between the set-top/back box and the remote control device can be made to be stateless—such pairing between the set-top/back box and the remote control device can be established or reestablished each time the set-top/back box is turned-on using the remote control device, and the pair request signal is received at the set-top/back box from the remote control device.

In a second aspect, a system for pairing information appliance devices to wireless remote control devices includes a plurality of set-top/back boxes, a plurality of television sets or other display devices communicably coupled to the plurality of set-top/back boxes, respectively, and at least one remote control device. The set-top/back boxes are each communicably coupled to at least one server computer (the "server") by at least one communications network. The remote control device is operative to transmit and/or receive line-of-sight control signals such as IR control signals, and non-line-of-sight control signals such as RF control signals, for use in pairing one or more of the set-top/back boxes to the respective remote control device, as well as controlling the television sets/display devices, and the set-top/back boxes to which the respective remote control device has been paired.

In a second exemplary mode of operation, a remote control device can be programmed to control one or more set-top/back boxes as follows. In this second mode of operation, a respective television set or other display device is communicably coupled to each set-top/back box. Further, at least one pushbutton, such as an ON/OFF pushbutton or any other suitable pushbutton, on the remote control device is programmed as a macro pushbutton. In addition, prior to the programming of the remote control device, it is assumed that the respective set-top/back boxes are unpaired with the remote control device.

In accordance with this second exemplary mode of operation, a user establishes a line-of-sight between the remote control device and a first one of the set-top/back boxes, as well as a line-of-sight between the remote control device and the television set/display device communicably coupled to the first set-top/back box. The user then presses the ON/OFF pushbutton on the remote control device, causing the remote control device to transmit at least one first line-of-sight macro control signal, such as a first IR macro control signal, to the first set-top/back box and the television set/display device. As described herein with reference to the first aspect of the application, this first IR macro control signal can include a first power-on command for turning-on the first set-top/back box, a second power-on command for turning-on the television set/display device, and a pair request signal that carries RF pairing information, including an identification code that uniquely identifies the remote control device to the first set-top/back box.

Upon the user's pressing of the ON/OFF pushbutton on the remote control device, the remote control device transmits the first IR macro control signal along the established lines-of-sight to the first set-top/back box and television set/display device, respectively, thereby turning-on the first set-top/back box and the television set/display device, and causing the first set-top/back box to initiate a pairing procedure with the remote control device to configure itself to receive and accept subsequent control signals (commands) from the remote control device. As noted above, the remote control device is identified by the identification code included in the RF pairing information carried by the pair request signal. Once the first set-top/back box is configured to receive/accept control signals/commands from the remote control device, the first set-top/back box transmits an RF pair response signal to the remote control device, including a predetermined pairing success code to confirm that it is now paired to the remote control device, thereby completing the pairing procedure.

In addition, the first set-top/back box transmits, to the server over the communications network, pairing data that includes a network address of the first set-top/back box, as well as the identification code for the remote control device to which it is now paired. The server stores the pairing data for the first set-top/back box, received over the communications network, in at least one database. The server can further receive, over the communications network, additional such pairing data for one or more other set-top/back boxes on the communications network, and store that additional pairing data in its database. For example, the server can be implemented as part of the back office system of a CATV service provider or any other suitable content service provider, or as part of the business management hardware/software of a hotel or any other suitable business establishment.

In further accordance with this second exemplary mode of operation, the server can use the pairing data stored in its database to arbitrate the pairing of the remote control device with one or more of the set-top/back boxes on the communications network. In an exemplary aspect, the server can modify the stored pairing data for a second set-top/back box on the communications network to pair the second set-top/back box to the remote control device, and transmit the modified pairing data to the network address of the second set-top/back box to configure it to receive and accept control signals/commands from the remote control device. Further, the server can transmit an unpairing signal to the network address of the first set-top/back box to break the pairing between the first set-top/back box and the remote control device, and modify the stored pairing data for the first set-top/back box to reflect the broken pairing, thereby assuring that only the second set-top/back box remains paired to the remote control device. Alternatively, the server can maintain the pairing between the first set-top/back box and the remote control device to allow both the first and second set-top/back boxes to be paired to the remote control device. In another exemplary aspect, the server can form one or more groups of any suitable number of the set-top/back boxes on the communications network, transmit pairing/unpairing signals, as appropriate, to the network addresses of the set-top/back boxes to form the respective groups, and modify the stored pairing data for the respective set-top/back boxes to reflect the resulting pairings, thereby allowing the set-top/back boxes in the respective groups to be paired to a single remote control device or multiple remote control devices, as desired and/or required for a particular purpose or intended use.

With further regard to this second exemplary mode of operation, the server can use pairing data stored in its database to effectively pre-pair a set-top/back box on the communications network to a remote control device, thereby configuring it to receive and accept control signals/commands from the remote control device. For example, the set-top/back box may be pre-paired to the remote control device before the set-top/back box is installed at the user's premises and the remote control device is provided to the user. Further, the pairing data for the set-top/back box and the remote control device may be scanned (e.g., by barcode) or otherwise entered into the database for subsequent access and use by the server. Alternatively, or in addition, once the set-top/back box is installed, the set-top/back box may query the server and/or the database over the communications network to access the appropriate pairing data, and, upon its activation or detection of the remote control device, initiate the pairing with the remote control device using that pairing data. A support representative of the content service provider may also remotely pair or pre-pair the set-top/back box to the remote control device, or unpair the set-top/back box from the remote control device, over the communications network, using the appropriate pairing data stored in the database.

By configuring a remote control device to transmit a first IR macro control signal that includes a power-on command for turning-on a set-top/back box, and a pair request signal that carries RF pairing information including an identification code uniquely identifying the remote control device, and, at a desirable time, to transmit a second IR macro control signal that includes a power-off command for turning-off the set-top/back box, and an unpair request signal that carries the RF pairing information including the identification code for the remote control device, the pairing between the set-top/back box and the remote control device can be made to be stateless. Such stateless pairing between the set-top/back box and the remote control device can advantageously facilitate the arbitration of subsequent pairings of the remote control device with one or more set-top/back boxes on a communications network, by a server communicably coupled to the respective set-top/back boxes over the communications network.

It is noted that the ordering of various steps and/or actions performed in the exemplary modes of operation described herein has been provided for purposes of illustration, and that the various steps/actions, as described herein, can be performed in any suitable order. It is further noted that other aspects of the present application can include software programs and/or hardware operative to perform any of the steps/actions summarized above and described in further detail below.

It is to be understood that systems, methods, apparatus, instructions on computer readable storage media, etc., as described herein, can be embodied as one or more software programs, firmware, a hybrid of software, hardware, and/or firmware, or hardware alone, such as within one or more processors, operating systems, and/or software applications. It is to be further understood that the server described herein can be embodied as one or more processes implemented in software, hardware, firmware, or any suitable combination thereof, on one or more computers or any other suitable computerized devices and/or one or more computerized components implemented in software, hardware, firmware, or any suitable combination thereof.

Various techniques described herein are well suited for pairing information appliance devices to wireless remote control devices. It should be noted, however, that the techniques described herein are not limited to use in such applications, and that the techniques described herein are suited for other applications as well.

In addition, although each of the different features, techniques, configurations, etc., described herein may be discussed in different places within the present application, it is intended, where suitable, that each of these concepts can be executed independently of, or in combination with, each other. Accordingly, the various aspects of the present application, as described herein, can be embodied and viewed in many different ways.

It is noted that this preliminary discussion of the various aspects of the present application does not specify every aspect of the application or claimed invention(s). Rather, this discussion presents general embodiments and corresponding points of novelty over conventional techniques. For further details and/or possible perspectives (permutations) of the claimed invention(s), the reader is directed to the Detailed Description and corresponding drawing figures of the present application, as provided below.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION AND FURTHER SUMMARY OF EMBODIMENTS

The disclosures of U.S. patent application Ser. No. 13/896,696 filed May 17, 2013 entitled IR PAIRING FOR RF4CE REMOTE CONTROLS, and U.S. Provisional Patent Application No. 61/792,447 filed Mar. 15, 2013 entitled IR INITIATED PAIRING, are hereby incorporated herein by reference in their entirety.

Systems, apparatus, and methods are disclosed for pairing information appliance devices, such as set-top boxes and/or set-back boxes (the "set-top/back boxes"), to wireless remote control devices. The disclosed systems, apparatus, and methods allow the pairing between a set-top/back box and a remote control device to be made to be stateless, thereby facilitating the arbitration of subsequent pairings of the remote control device with one or more set-top/back boxes on a communications network, by a server computer (the "server") communicably coupled to the respective set-top/back boxes over the communications network.

Figure 1:
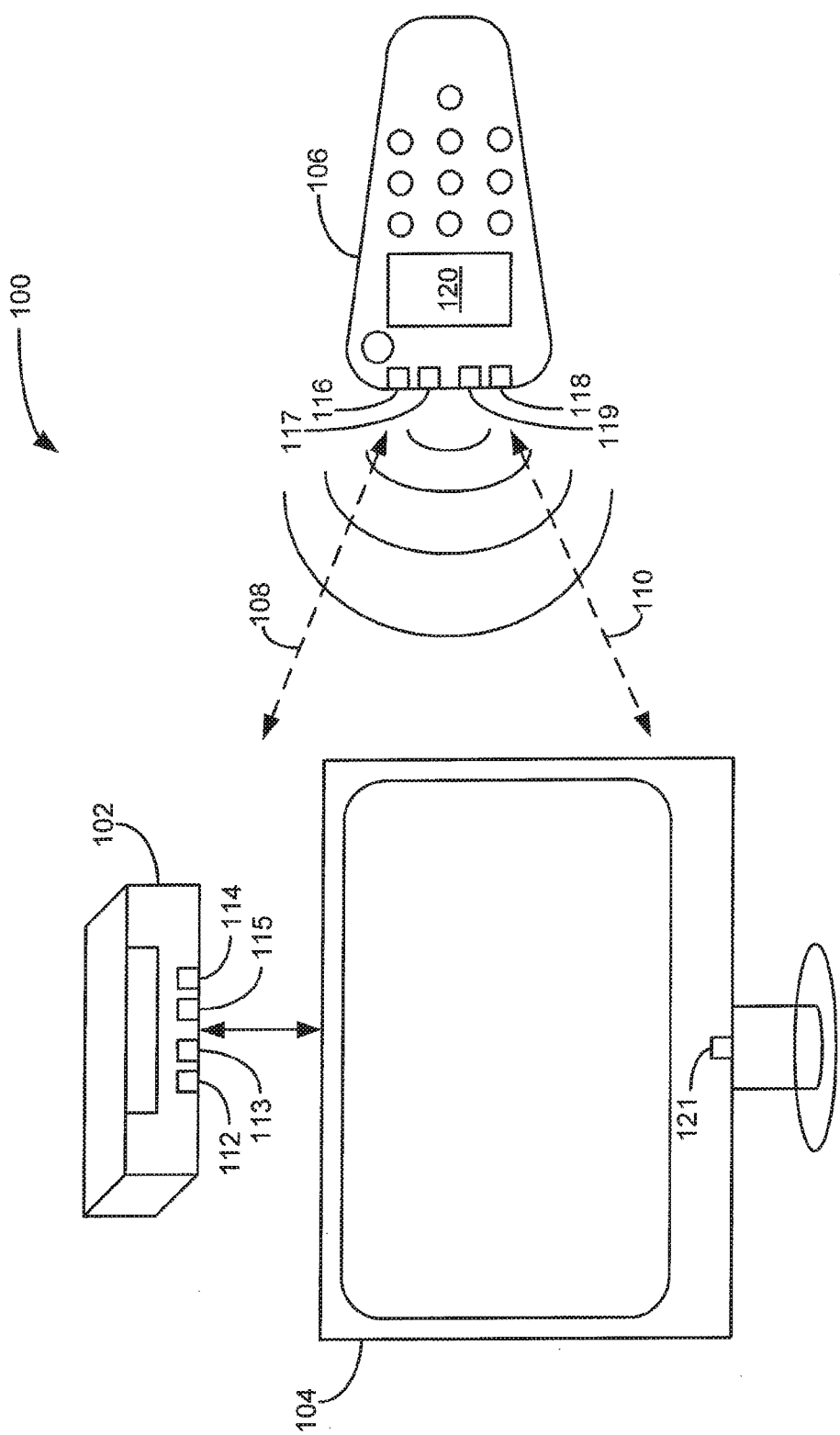
FIG. 1 is a block diagram of an exemplary system for pairing information appliance devices to wireless remote control devices, in accordance with the present application.

FIG. 1 depicts an illustrative embodiment of an exemplary system 100 for pairing information appliance devices to wireless remote control devices, in accordance with the present application. As shown in FIG. 1, the system 100 includes a set-top box 102, a television set 104 or any other suitable display device communicably coupled to the set-top box 102, and a remote control device 106. For example, the remote control device 106 and the set-top box 102 may be configured to communicate with one another using Radio Frequency for Consumer Electronics (RF4CE) communications, WiFi or 802.11 based communications, Bluetooth communications, Zigbee communications, or any other suitable wireless communications.

The remote control device 104 includes a line-of-sight (e.g., infrared (IR)) transmitter/receiver 118, 119 operative to transmit/receive line-of-sight control signals such as IR control signals, and a non-line-of-sight (e.g., radio frequency (RF)) transmitter/receiver 116, 117 operative to transmit/receive non-line-of-sight control signals such as RF control signals, for use in pairing the set-top box 102 to the remote control device 106, as well as controlling the television set 104, and the set-top box 102 to which the remote control device 106 has been paired. The set-top box 102 includes an IR receiver 112 operative to receive IR control signals transmitted by the IR transmitter 118 of the remote control device 106, an IR transmitter 113 operative to transmit IR control signals to the IR receiver 119 of the remote control device 106, an RF receiver 114 operative to receive RF control signals transmitted by the RF transmitter 116 of the remote control device 106, and an RF transmitter 115 operative to transmit RF control signals to the RF receiver 117 of the remote control device 106. Likewise, the television set 104 includes an IR receiver 121 operative to receive IR control signals transmitted by the IR transmitter 118 of the remote control device 106.

Figure 2A:
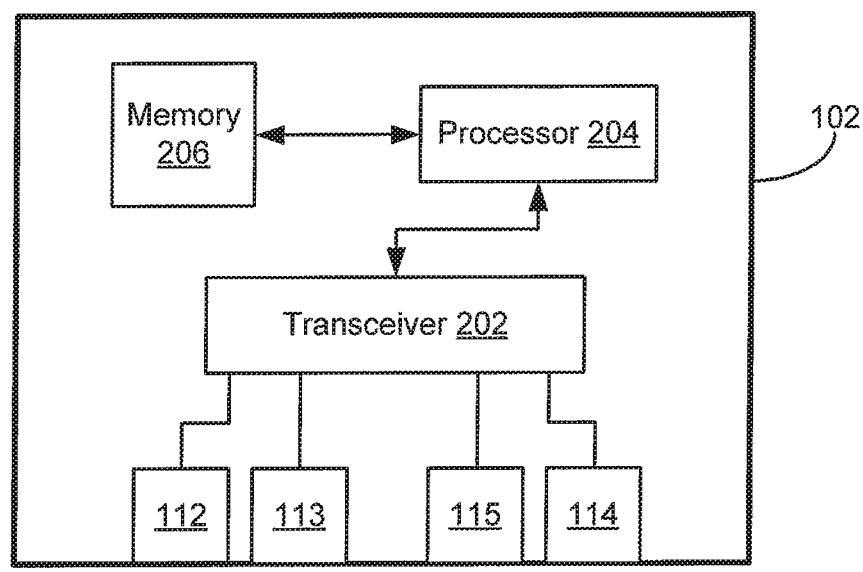
FIGS. 2a and 2b are block diagrams of an exemplary set-top box and an exemplary remote control device, respectively, both of which are included in the system of FIG. 1.

FIG. 2a depicts a detailed view of the set-top box 102 included in the system 100 of FIG. 1. As shown in FIG. 2a, the set-top box 102 includes the IR receiver 112, the IR transmitter 113, the RF receiver 114, and the RF transmitter 115. The set-top box 102 further includes an IR/RF transceiver 202, a processor 204 communicably coupled to the IR/RF transceiver 202, and an internal memory 206 communicably coupled to the processor 204. The processor 204 is operative to execute at least one software program out of the internal memory 206 for implementing the various techniques for pairing information appliance devices to wireless remote control devices described herein.

Figure 2B:
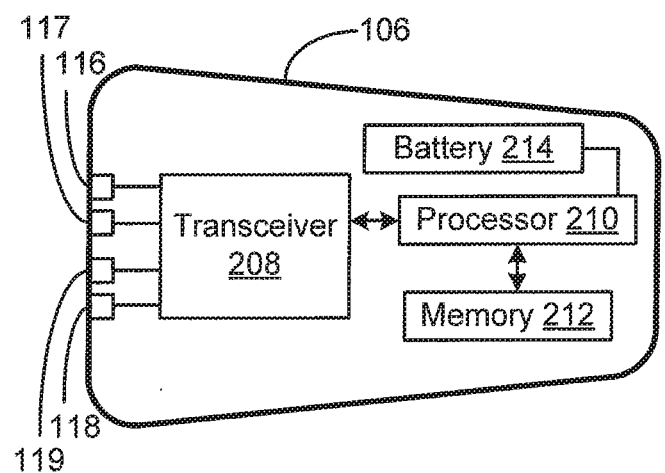

FIG. 2b depicts a detailed view of the remote control device 106 included in the system 100 of FIG. 1. As shown in FIG. 2b, the remote control device 106 includes the IR transmitter 118, the IR receiver 119, the RF transmitter 116, and the RF receiver 117. The remote control device 106 further includes an IR/RF transceiver 208, a processor 210 communicably coupled to the IR/RF transceiver 208, and a memory 212 communicably coupled to the processor 210, and a battery 214. Like the processor 204 included in the set-top box 102, the processor 210 is operative to execute at least one software program out of the memory 212 for implementing the various techniques for pairing information appliance devices to wireless remote control devices described herein.

In an exemplary mode of operation, the remote control device 106 (see FIG. 1) can be programmed to control the set-top box 102 (see FIG. 1) as follows. In this mode of operation, at least one pushbutton on the remote control device 106 is programmed as a macro pushbutton, as known in the art, for performing one or more functions/commands that would typically otherwise require the actuation of several pushbuttons on the remote control device 106. In addition, prior to the programming of the remote control device 106, it is assumed that the set-top box 102 is unpaired with the remote control device 106.

In accordance with this exemplary mode of operation, a user can manually turn-on the set-top box 102, and establish a line-of-sight between the remote control device 106 and the set-top box 102. The user can then press or otherwise actuate a specified macro pushbutton, such as an ON/OFF pushbutton or any other suitable pushbutton, on the remote control device 106, and hold down the specified macro pushbutton for at least a predetermined period of time (e.g., 5 seconds), causing the remote control device 106 to transmit, to the set-top box 102, a line-of-sight pair request signal carrying RF pairing information, including an identification code that uniquely identifies the remote control device 106 to the set-top box 102. In response to the pair request signal, the set-top box 102 initiates a pairing procedure with the remote control device 106, using the RF pairing information carried by the pair request signal, thereby configuring itself to receive and accept subsequent control signals (also referred to herein as "commands") from the remote control device 106, which is identified by the identification code included in the RF pairing information.

Once the set-top box 102 is configured to receive/accept control signals/commands from the remote control device 106, the set-top box 102 stores the RF pairing information in its internal memory, and transmits an RF pair response signal to the remote control device 106, including a predetermined pairing success code to confirm that it is now paired to the remote control device 106, thereby completing the initial pairing procedure. In an exemplary aspect, upon the specified macro pushbutton having been held down or otherwise actuated for the predetermined period of time, the remote control device 106 automatically programs the ON/OFF pushbutton on the remote control device 106 for transmitting at least one first line-of-sight macro control signal, as further described below. Having initially paired the set-top box 102 to the remote control device 106, the user can then manually turn-off the set-top box 102.

In further accordance with this exemplary mode of operation, the user again establishes a line-of-sight 108 between the remote control device 106 and the set-top box 102, as well as a line-of-sight 110 between the remote control device 106 and the television set 104 communicably coupled to the set-top box 102. The user then presses or otherwise actuates the ON/OFF pushbutton on the remote control device 106, causing the remote control device 106 to transmit the first line-of-sight macro control signal, such as a first IR macro control signal, to the set-top box 102 and the television set 104 over the line-of-sight 108 and the line-of-sight 110, respectively. The first IR macro control signal can include one or more power-on commands, such as a first power-on command for turning-on the set-top box 102 and a second power-on command for turning-on the television set 104, and a pair request signal. The pair request signal carries RF pairing information, including the identification code that uniquely identifies the remote control device 106 to the set-top box 102.

Upon the user's pressing of the ON/OFF pushbutton on the remote control device 106, the remote control device 106 transmits the first IR macro control signal along the established lines-of-sight 108, 110 to the set-top box 102 and television set 104, respectively. In response to the first and second power-on commands included in the first IR macro control signal, the respective set-top box 102 and television set 104 are turned-on. Further, in response to the pair request signal included in the first IR macro control signal, the set-top box 104 initiates a pairing procedure with the remote control device 106. The pairing procedure can include determining whether or not the RF pairing information included in the pair request signal already exists in the internal memory 206 (see FIG. 2) of the set-top box 102.

If the set-top box 102 determines that the RF pairing information already exists in its internal memory 206, then the set-top box 102 can terminate the pairing procedure, and use the RF pairing information in the internal memory 206, as needed, to configure itself to receive and accept subsequent control signals (commands) from the remote control device 106. Otherwise, if the set-top box 102 determines that the RF pairing information does not exist in its internal memory 206, then the set-top box 102 can proceed with the pairing procedure, using the newly received RF pairing information to configure itself to receive and accept subsequent control signals (commands) from the remote control device 106, which is identified by the identification code included in the RF pairing information.

Having been paired to the remote control device 106, the set-top box 102 is now operative to receive and accept IR and/or RF control signals/commands from the remote control device 106, such as IR/RF commands to turn the set-top box 102 "on" and "off", to change channels on the set-top box 102, to access special features provided by the set-top box 102, etc. In addition, the television set 104 is operative to receive further IR control signals/commands from the remote control device 106, such as IR commands to turn the television set 104 "on" and "off", to raise, lower, and/or mute the volume of the television set 104, etc.

At a desirable time, the user can again press the ON/OFF pushbutton on the remote control device 106, causing the remote control device 106 to transmit at least one second line-of-sight macro control signal, such as a second IR macro control signal, to the set-top box 102 and the television set 104. The second IR macro control signal can include one or more power-off commands, such as a first power-off command for turning-off the set-top box 102 and a second power-off command for turning-off the television set 104, and an unpair request signal, which carries the RF pairing information including the identification code for the remote control device 106.

Upon the user's pressing of the ON/OFF pushbutton on the remote control device 106, the remote control device 106 transmits the second IR macro control signal along the established lines-of-sight 108, 110 to the set-top box 102 and television set 104, respectively. In response to the first and second power-off commands included in the second IR macro control signal, the respective set-top box 102 and television set 104 are turned-off. Further, in response to the unpair request signal included in the second IR macro control signal, the set-top box 102 initiates an unpairing procedure with the remote control device 106. The unpairing procedure can include breaking the pairing between the set-top box 102 and the remote control device 106, while maintaining the RF pairing information in the set-top box's internal memory 206. In this way, the pairing between the set-top box 102 and the remote control device 106 can be made to be stateless—such pairing between the set-top box 102 and the remote control device 106 can be established or reestablished each time the set-top box 102 is turned-on using the remote control device 106, and the pair request signal is received at the set-top box 102 from the remote control device 106.

Figure 3:
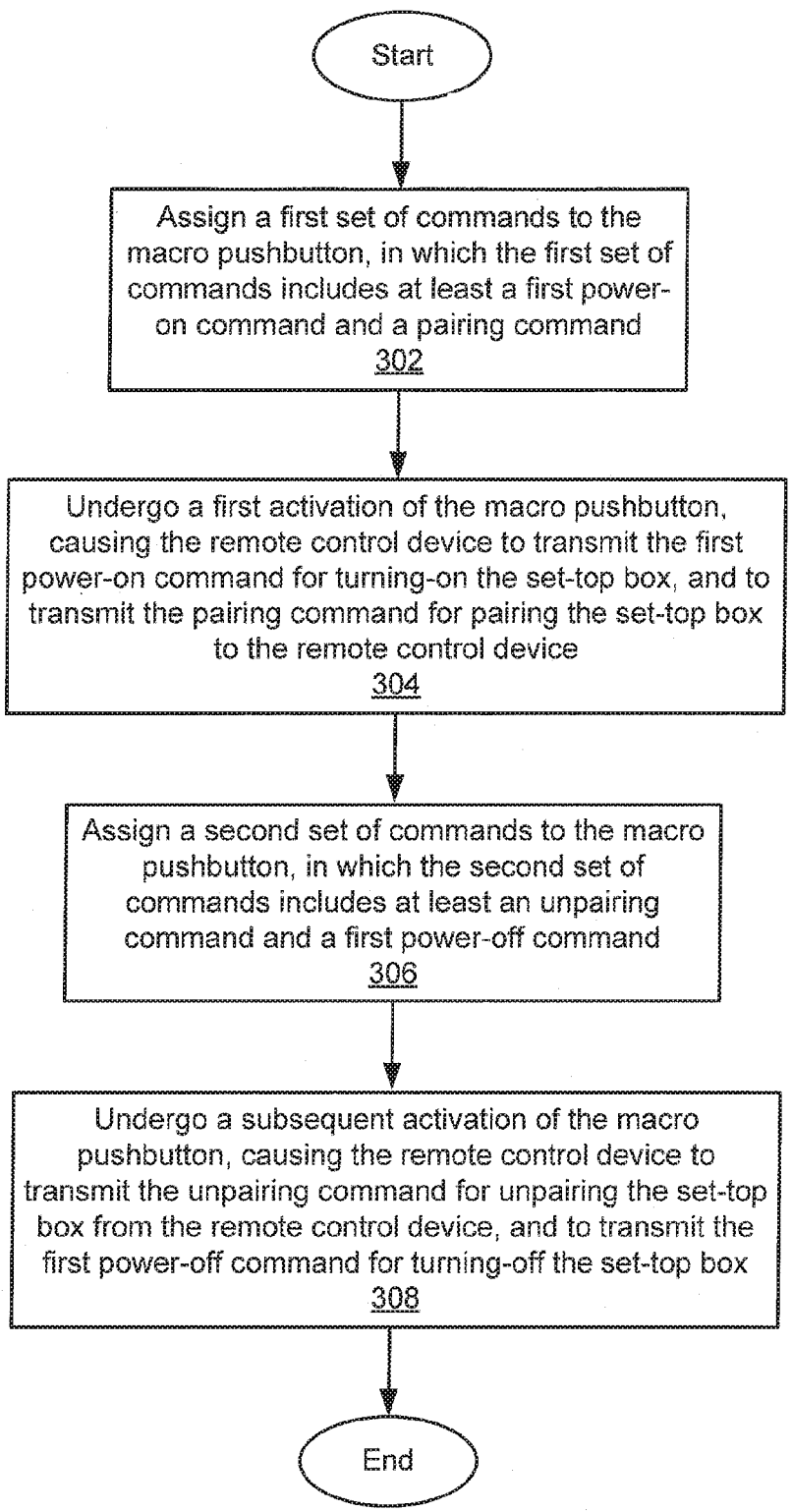
FIG. 3 is a flow diagram of an exemplary method of operating the system of FIG. 1.

FIG. 3 depicts an exemplary method of operating the system 100 of FIG. 1. In this exemplary method, stateless pairing of the set-top box 102 to the remote control device 106 can be achieved, using at least one macro pushbutton included in the remote control device 106. As depicted in block 302, a first set of commands is assigned to the macro pushbutton, in which the first set of commands includes at least a first power-on command and a pairing command. As depicted in block 304, the macro pushbutton undergoes a first activation, causing the remote control device 106 to transmit the first power-on command for turning-on the set-top box 102, and to transmit the pairing command for pairing the set-top box 102 to the remote control device 106. As depicted in block 306, a second set of commands is assigned to the macro pushbutton, in which the second set of commands includes at least an unpairing command and a first power-off command. As depicted in block 308, the macro pushbutton undergoes a subsequent activation, causing the remote control device 106 to transmit the unpairing command for unpairing the set-top box 102 from the remote control device 106, and to transmit the first power-off command for turning-off the set-top box 102.

Figure 4:
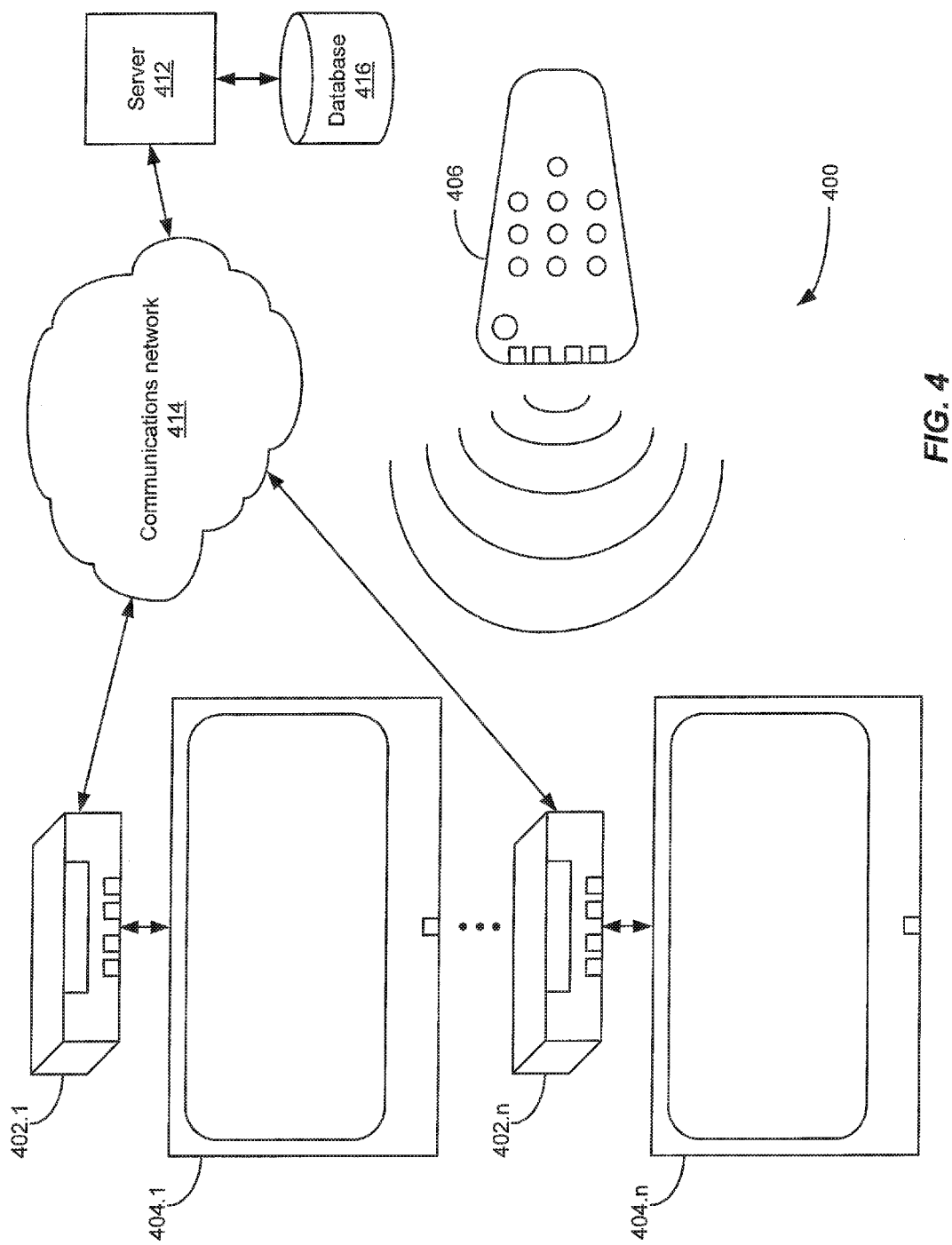
FIG. 4 is a block diagram of an alternative embodiment of the system of FIG. 1.

FIG. 4 depicts an illustrative alternative embodiment 400 of the system 100 of FIG. 1. As shown in FIG. 4, the system 400 includes a plurality of set-top boxes 402.1-402.n, a plurality of television sets 404.1-404.n communicably coupled to the plurality of set-top boxes 402.1-402.n, respectively, and a remote control device 406. The set-top boxes 402.1-402.n are each communicably coupled to a server computer 412 (the "server") by a communications network 414. The remote control device 406 is operative to transmit and/or receive line-of-sight control signals such as IR control signals, and non-line-of-sight control signals such as RF control signals, for use in pairing one or more of the set-top boxes 402.1-402.n to the remote control device 106, as well as controlling the television sets 404.1-404.n, and the set-top boxes 402.1-402.n to which the remote control device 406 has been paired.

In an exemplary mode of operation, the remote control device 406 can be programmed to control one or more of the set-top boxes 402.1-402.n as follows. In this mode of operation, at least one pushbutton, such as an ON/OFF pushbutton or any other suitable pushbutton, on the remote control device 406 is programmed as a macro pushbutton. In addition, prior to the programming of the remote control device 406, it is assumed that the respective set-top boxes 402.1-402.n are unpaired with the remote control device 406.

In accordance with this exemplary mode of operation, a user establishes a line-of-sight between the remote control device 406 and one of the set-top boxes 402.1-402.n (e.g., the set-top box 402.1), as well as a line-of-sight between the remote control device 406 and the television set 404.1 communicably coupled to the set-top box 402.1. The user then presses the ON/OFF pushbutton on the remote control device 406, causing the remote control device 406 to transmit at least one first line-of-sight macro control signal, such as a first IR macro control signal, to the set-top box 402.1 and the television set 404.1, respectively. The first IR macro control signal can include a first power-on command for turning-on the set-top box 402.1, a second power-on command for turning-on the television set 404.1, and a pair request signal that carries RF pairing information, including an identification code that uniquely identifies the remote control device 406 to the set-top box 402.1.

Upon the user's pressing of the ON/OFF pushbutton on the remote control device 406, the remote control device 406 transmits the first IR macro control signal along the established lines-of-sight to the set-top box 402.1 and television set 404.1, respectively, thereby turning-on the set-top box 402.1 and the television set 404.1, and causing the set-top box 402.1 to initiate a pairing procedure with the remote control device 406 to configure itself to receive and accept subsequent control signals (commands) from the remote control device 406. As noted above, the remote control device 406 is identified by the identification code included in the RF pairing information carried by the pair request signal. Once the set-top box 402.1 is configured to receive/accept control signals/commands from the remote control device 406, the set-top box 402.1 transmits an RF pair response signal to the remote control device 406, including a predetermined pairing success code to confirm that it is now paired to the remote control device 406, thereby completing the pairing procedure.

In addition, the set-top box 402.1 transmits, to the server 412 over the communications network 414, pairing data that includes a network address of the set-top box 402.1, as well as the identification code for the remote control device 406 to which it is now paired. The server 412 stores the pairing data for the set-top box 402.1, received over the communications network 414, in a database 416. The server 412 can further receive, over the communications network 414, additional such pairing data for one or more of the other set-top boxes 402.2-402.n on the communications network 414, and store that additional pairing data in the database 416. For example, the server 412 can be implemented as part of the back office system of a CATV service provider or any other suitable content service provider, or as part of the business management hardware (HW)/software (SW) of a hotel or any other suitable business establishment.

In further accordance with this exemplary mode of operation, the server 412 implemented as part of a back office system or business management HW/SW can be used to arbitrate the pairing of the remote control device 406 with one or more of the set-top boxes 402.1-402.n on the communications network 414, using the pairing data stored in the database 416. For example, a portal associated with the back office system or business management HW/SW can be configured to display the identification code(s) for one or more paired remote control devices, such as the remote control device 406 currently paired with the set-top box 402.1. Further, the server 412 can be used to modify the stored pairing data for the set-top box 402.n to pair it to the remote control device 406, and to transmit the modified pairing data to the network address of the set-top box 402.n, thereby configuring it to receive and accept control signals/commands from the remote control device 406.

Moreover, the server 412 can be used to transmit an unpairing signal to the network address of the set-top box 402.1 to break the current pairing between the set-top box 402.1 and the remote control device 406, and to modify the stored pairing data for the set-top box 402.1 to reflect the broken pairing, thereby assuring that only the set-top box 402.n remains paired to the remote control device 406. Alternatively, the server 412 can maintain the current pairing between the set-top box 402.1 and the remote control device 406 to allow both of the set-top boxes 402.1 and 402.n to be paired to the remote control device 406.

In addition, the server 412 can be used to form one or more groups of any suitable number of the set-top boxes 402.1-402.n on the communications network 414, to transmit pairing/unpairing signals, as appropriate, to the network addresses of the respective set-top boxes 402.1-402.n, and to modify the stored pairing data for the respective set-top boxes 402.1-402.n to reflect the resulting pairings, thereby allowing the set-top boxes 402.1-402.n in the respective groups to be paired to the single remote control device 406, or multiple remote control devices, as desired and/or required for a particular purpose or intended use.

Figure 5:
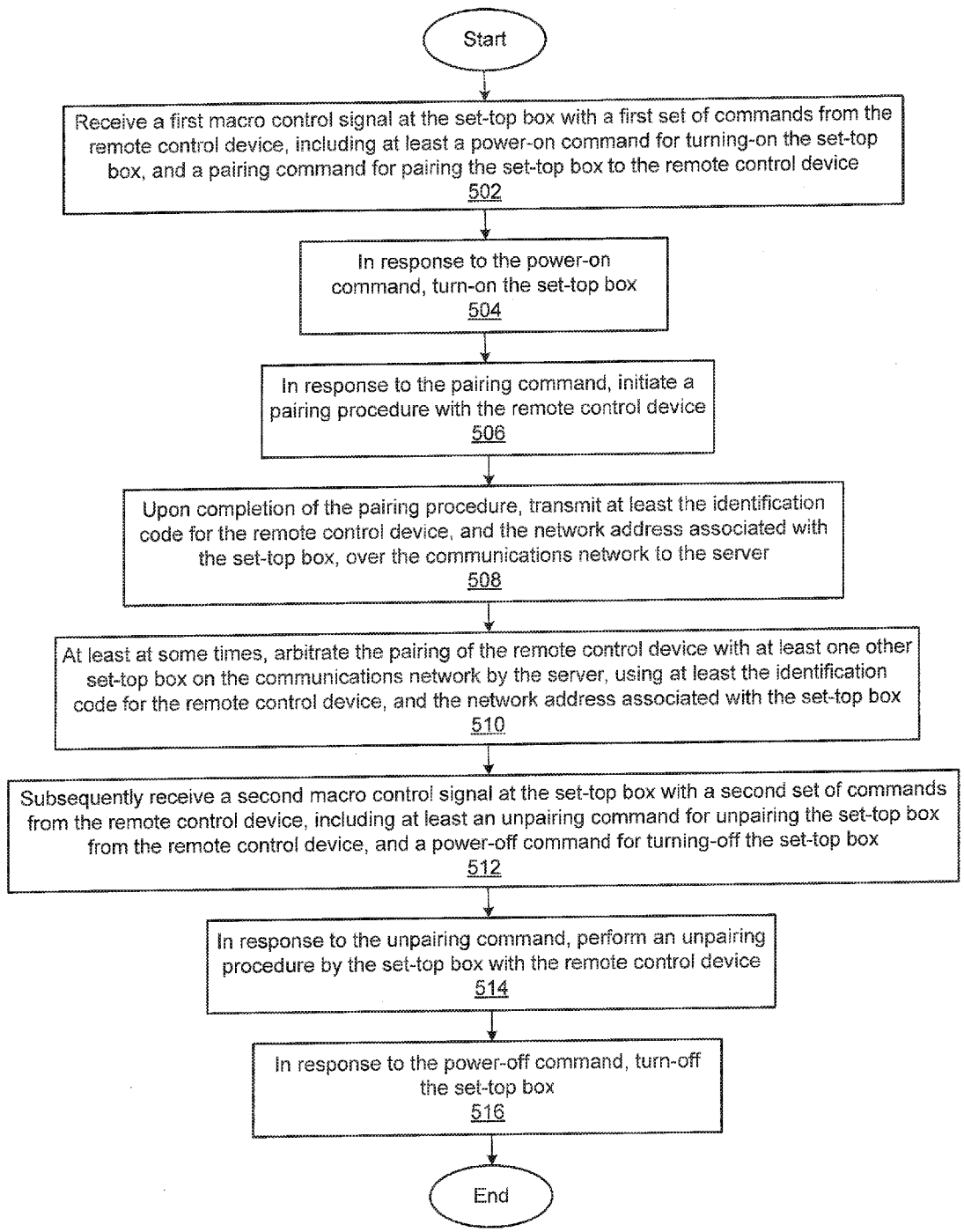
FIG. 5 is a flow diagram of an exemplary method of operating the alternative embodiment of FIG. 4.

FIG. 5 depicts an exemplary method of operating the alternative embodiment 400 (see FIG. 4) of the system 100 of FIG. 1. In this exemplary method, the set-top box 402.1 is controllable by the remote control device 406, and communcably coupled to the server 412 over the communications network 414. As depicted in block 502, a first macro control signal is received at the set-top box 402.1 with a first set of commands from the remote control device, including at least a power-on command for turning-on the set-top box 402.1, and a pairing command for pairing the set-top box 402.1 to the remote control device 406. The pairing command includes a pair request with an identification code for the remote control device 406, and the set-top box 402.1 has an associated network address. As depicted in block 504, in response to the power-on command, the set-top box 402.1 is turned-on. As depicted in block 506, in response to the pairing command, a pairing procedure is initiated by the set-top box 402.1 with the remote control device 406. As depicted in block 508, upon completion of the pairing procedure, at least the identification code for the remote control device 406, and the network address associated with the set-top box 402.1, are transmitted over the communications network 414 to the server 412. As depicted in block 510, at least at some times, the pairing of the remote control device 406 with at least one other set-top box 402.2-402.n on the communications network 414 is arbitrated by the server 412, using at least the identification code for the remote control device 406, and the network address associated with the set-top box 402.1. As depicted in block 512, a second macro control signal is subsequently received at the set-top box 402.1 with a second set of commands from the remote control device 406, including at least an unpairing command for unpairing the set-top box 402.1 from the remote control device 406, and a power-off command for turning-off the set-top box 402.1. As depicted in block 514, in response to the unpairing command, an unpairing procedure is performed by the set-top box 402.1 with the remote control device 406. As depicted in block 516, in response to the power-off command, the set-top box 402.1 is turned-off.

Having described the above exemplary embodiments of the disclosed systems, apparatus, and methods, other alternative embodiments or variations may be made. For example, it was described herein that the remote control device 106 could be configured to implement various techniques for pairing information appliance devices to wireless remote control devices using RF4CE communications, WiFi or 802.11 based communications, Bluetooth communications, Zigbee communications, etc. In one or more alternative embodiments, a smartphone, a tablet computer, a laptop computer, or any other suitable network-enabled or non-network-enabled computerized device may be employed in place of, or in addition to, a remote control device for implementing the various techniques described herein. In one embodiment, a smartphone, such as an iPhone®, Android®, Blackberry®, or Windows®-based smartphone, can be configured to implement the various techniques described herein, directly communicating with a set-top/back box using, e.g., Bluetooth communications, or any other suitable wireless communications.

It was further described herein that the remote control device 106 could transmit, to the set-top box 102, a pair request signal in the form of an IR macro control signal. Because a line-of-sight would be required for the remote control device 106 to transmit such an IR macro control signal to the set-top box 102, the remote control device 106 and the set-top box 102 must typically be in the same location, e.g., the same room, in order for the set-top box 102 to receive/accept the pair request signal, and to perform a pairing procedure with the remote control device 106. In one or more alternative embodiments, a remote control device may be configured to transmit a pair request signal to a set-top/back box in the form of a non-line-of-sight control signal, such as an RF macro control signal.

Moreover, in one embodiment, prior to transmitting a pair request signal to a set-top/back box, a remote control device can be further configured to perform a discovery procedure to identify one or more set-top/back boxes within the radio vicinity of the remote control device. For example, such a discovery procedure can include, in response to a user pressing a specified pushbutton on the remote control device, transmitting a non-line-of-sight (e.g., RF) discovery request signal. In this exemplary discovery procedure, it is assumed that the set-top/back boxes within the radio vicinity of the remote control device are in a power state sufficient to allow them to receive and respond to the RF discovery request signal from the remote control device. In response to the RF discovery request signal, at least some of the respective set-top/back boxes can transmit RF discovery response signals to the remote control device. For example, each RF discovery response signal can include information pertaining to the address of the respective set-top/back box that transmitted the RF discovery response signal, as well as various criteria such as the device type, application profile, etc., of the respective set-top/back box.

In this embodiment, the remote control device can further include a display 120 (see, e.g., FIG. 1) for displaying a list of the set-top/back boxes that transmitted the RF discovery response signals, as identified by at least some of the information contained in the respective RF discovery response signals. Using one or more specified pushbuttons on the remote control device, the user can select, based on the device type, application profile, etc., one of the set-top/back boxes in the list displayed on the display 120, thereby causing the remote control device to transmit a line-of-sight (e.g., IR) or non-line-of-sight (e.g., RF) pair request signal to the address of the selected set-top/back box. For example, the remote control device can send the IR or RF pair request signal to the selected set-top/back box as a unicast transmission. Upon receipt of the IR or RF pair request signal, the selected set-top/back box can perform a pairing procedure with the remote control device, as described hereinabove. In addition, at the completion of the pairing procedure, the remote control device can optionally establish a secure key with the selected set-top/back box.

It is noted that, in one or more embodiments, communications between a remote control device and a respective set-top/back box are typically asynchronous, and can be originated by either the remote control device or the set-top/back box. Further, the remote control device and/or the respective set-top/box can generate signal transmissions that are unicast/acknowledged, unsecured, and single channel, unacknowledged/broadcast, secured, and multi-channel, or any other suitable combination thereof.

In the above detailed description of the disclosed systems, apparatus, and methods, numerous specific details have been set forth to provide a thorough understanding of claimed subject matter. However, it will be understood by those skilled in the art that such claimed subject matter may be practiced without these specific details. In other instances, methods, apparatus, systems, etc., that would be known by one of ordinary skill in the art have not been described in detail so as not to obscure the claimed subject matter. Some portions of the detailed description have been presented in terms of algorithms or symbolic representations of operations on information, data, and/or signals stored within memory, such as a computer memory. These algorithmic descriptions or representations are examples of techniques used by those of ordinary skill in the data processing arts to convey the substance of their work to others skilled in the art.

An algorithm as described herein, and generally, is considered to be a self-consistent sequence of operations or similar processing steps leading to a desired result. In this context, such operations or processing steps involve physical manipulation of physical quantities. Typically, although not necessarily, such quantities may take the form of electrical or magnetic signals capable of being stored, transferred, combined, compared, or otherwise manipulated. It has been convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing", "computing", "calculating", "determining", or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application, as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method of pairing a remote control device and a target device, the method comprising:

assigning a first set of commands to a first macro pushbutton of the remote control device, the first set of commands including a first power-on command and a pairing command; and wherein a first activation of the first macro pushbutton is operable to cause the remote control device to transmit (1) the first power-on command to turn ON the target device, and (2) the pairing command to pair the target device to the remote control device.

2. The method of claim 1 further comprising:

assigning a second set of commands to the first macro pushbutton, the second set of commands including an unpairing command and a first power-off command; and wherein a subsequent activation of the first macro pushbutton is operable to cause the remote control device to transmit (1) the unpairing command to unpair the target device from the remote control device, and (2) the first power-off command to turn OFF the target device.

3. The method of claim 2, wherein the first activation of the first macro pushbutton is further operable to cause the remote control device to transmit the first power-on command and the pairing command as a first line-of-sight signal.

4. The method of claim 3, wherein the subsequent activation of the first macro pushbutton is further operable to cause the remote control device to transmit the first power-off command and the unpairing command as a second line-of-sight signal.

5. The method of claim 2, wherein the first activation of the first macro pushbutton is further operable to cause the remote control device to transmit the pairing command including a pair request with an identification code of the remote control device.

6. The method of claim 5, wherein the first activation of the first macro pushbutton is further operable to cause the remote control device to transmit the pairing command including the pair request with the identification code to pair the target device to the remote control device using non-line-of-sight signaling.

7. The method of claim 2, wherein the subsequent activation of the first macro pushbutton is further operable to cause the remote control device to transmit the unpairing command including an unpair request with an identification code of the remote control device.

8. The method of claim 7, wherein the subsequent activation of the first macro pushbutton is further operable to cause the remote control device to transmit the unpairing command including the unpair request with the identification code to unpair the target device from the remote control device using non-line-of-sight signaling.

9. The method of claim 2, wherein the target device is communicably coupleable to an electronic communication device, wherein the assigning of the first set of commands to the first macro pushbutton includes assigning a second power-on command to the first macro pushbutton for turning on the electronic communication device, and wherein the first activation of the first macro pushbutton is further operable to cause the remote control device to transmit the second power-on command to turn ON the electronic communication device.

10. The method of claim 9, wherein the assigning of the second set of commands to the first macro pushbutton includes assigning a second power-off command to the first macro pushbutton for turning off the electronic communication device, and wherein the subsequent activation of the macro pushbutton is further operable to cause the remote control device to transmit the second power-off command to turn OFF the electronic communication device.

11. A method of pairing a remote control device and a target device, the method comprising:

receiving, at the target device, in a first macro control signal, a first set of commands from the remote control device, the first set of commands including a power-on command to turn ON the target device, and a pairing command to pair the target device to the remote control device:
  in response to receiving the power-on command, turning-on the target device;
  in response to receiving the pairing command, initiating, by the target device, a pairing procedure with the remote control device;
  subsequently receiving, at the target device in a second macro control signal, a second set of commands from the remote control device, the second set of commands including an unpairing command to unpair the target device from the remote control device, and a power-off command to turn OFF the target device;
  in response to receiving the unpairing command, performing, by the target device, an unpairing procedure with the remote control device; and
  in response to receiving the power-off command, turning-off the target device.

12. The method of claim 11, wherein the receiving of the first set of commands from the remote control device includes receiving the first macro control signal as a first line-of-sight signal.

13. The method of claim 12, wherein the subsequent receiving of the second set of commands from the remote control device includes subsequently receiving the second macro control signal as a second line-of-sight signal.

14. The method of claim 11, wherein the receiving of the pairing command includes receiving a pair request with an identification code of the remote control device.

15. The method of claim 14, wherein the pairing procedure includes determining, by the target device, whether the identification code for the remote control device exists in an internal memory of the target device.

16. The method of claim 15, wherein the pairing procedure further includes, in an event that the identification code for the remote control device exists in internal memory of the target device, terminating the pairing procedure, and configuring the target device to receive and accept subsequent commands from the remote control device using the identification code of the remote control device.

17. The method of claim 16, wherein the pairing procedure further includes, in the event that the identification code of the remote control device does not exist in the internal memory of the target device, performing, by the target device, the pairing procedure using the identification code of the remote control device received with the pair request.

18. The method of claim 17, wherein the performing of the pairing procedure includes performing the pairing procedure using non-line-of-sight signaling.

19. The method of claim 17, further comprising:
  upon completion of the pairing procedure, transmitting, by the target device, a pair response signal to the remote control device to confirm that the target device is now paired to the remote control device.

20. The method of claim 11, wherein the receiving of the unpairing command includes receiving an unpair request with an identification code of the remote control device.

21. The method of claim 20, wherein the performing of the unpairing procedure includes breaking the pairing between the target device and the remote control device.

22. The method of claim 21, wherein the breaking of the pairing between the target device and the remote control device includes maintaining the identification code of the remote control device in an internal memory of the target device.

23. The method of claim 22, wherein the performing of the unpairing procedure further includes performing the unpairing procedure using non-line-of-sight signaling.

24. In a target device controllable by at least one remote control device, and communicably coupleable to a server computer over at least one communications network, a method of pairing of the target device to the at least one remote control device, the method comprising:
  receiving, at the target device in a first macro control signal, a first set of commands from the remote control device, the first set of commands including at least a power-on command for turning-on the target device, and a pairing command for pairing the target device to the remote control device, the pairing command including a pair request with an identification code of the remote control device, the target device having an associated network address;
  in response to receiving the power-on command, turning-on the target device;
  in response to receiving the pairing command, initiating, by the target device, a pairing procedure with the remote control device;
  upon completion of the pairing procedure, transmitting, over the communications network by the target device, the identification code for the remote control device and the network address associated with the target device, to the server computer;
  arbitrating, by the server computer, the pairing of the remote control device with at least one other target device on the communications network, using at least the identification code for the remote control device, and the network address associated with the target device;
  subsequently receiving, at the target device in a second macro control signal, a second set of commands from the remote control device, the second set of commands including at least an unpairing command for unpairing the target device from the remote control device, and a power-off command for turning-off the target device;
  in response to the unpairing command, performing, by the target device, an unpairing procedure with the remote control device; and
  in response to the power-off command, turning-off the target device.

25. The method of claim 24 further comprising:
  storing, by the server computer, the identification code for the remote control device, and the network address associated with the target device, in a repository, the identification code for the remote control device and the network address for the target device constituting pairing data for the target device.

26. The method of claim 25 wherein the arbitrating of the pairing of the remote control device with at least one other target device on the communications network includes breaking the pairing between the target device and the remote control device, and modifying the pairing data for the target device in the database to reflect the broken pairing.

27. The method of claim 25 wherein the repository is operative to store pairing data including network addresses for the at least one other target device on the communications network, and wherein the arbitrating of the pairing of the remote control device with the at least one other target device on the communications network includes transmitting, over the communications network by the server computer, one or more of pairing signals and unpairing signals to the network addresses for the at least one other target device on the communications network, thereby pairing a group of pairable devices to the remote control device.

28. The method of claim 27 wherein the arbitrating of the pairing of the remote control device with the at least one other target device on the communications network includes modifying the pairing data in the database to reflect the pairing of the group of target devices to the remote control device.

29. A remote control device for controlling at east one pairable device, the remote control device comprising:
  at least one macro pushbutton;
  a memory; and
  a processor operative to:
    assign a first set of commands to the at least one macro pushbutton, the first set of commands including at least a first power-on command and a pairing command, wherein a first activation of the macro pushbutton is operable to cause the remote control device to transmit the first power-on command for turning-on a target device, and to transmit the pairing command to pair the target device to the remote control device; and
    assign a second set of commands to the at least one macro pushbutton, the second set of commands including at least an unpairing command and a first power-off command, wherein a subsequent activation of the macro pushbutton is operable to cause the remote control device to transmit the unpairing command for unpairing the target device from the remote control device, and to transmit the first power-off command for turning-off the pairable device,
  thereby allowing stateless pairing of the target device to the remote control device.

30. A target device controllable by a remote control device, the target device comprising:
  a transceiver;
  memory; and
  a processor operative to:
    receive, in a first macro control signal, a first set of commands from the remote control device, the first set of commands including at least a power-on command for turning-on the target device, and a pairing command for pairing the target device to the remote control device;
    in response to the power-on command, turn-on the target device;
    in response to the pairing command, to initiate a pairing procedure with the remote control device;
    subsequently receive, in a second macro control signal, a second set of commands from the remote control device, the second set of commands including at least an unpairing command for unpairing the target device from the remote control device, and a power-off command for turning-off the target device;
    in response to the unpairing command, perform an unpairing procedure with the remote control device; and
    in response to the power-off command, turn-off the target device,
  thereby allowing stateless pairing of the target device to the remote control device.

31. The method of claim 1, wherein the target device is operable to control playback of content on a display screen.

32. The method of claim 1, wherein the target device is a television set.

33. The method of claim 11, wherein the target device is operable to control playback of content on a display screen.

34. The method of claim 11, wherein the target device is a television set.

35. The method of claim 24, wherein the target device is operable to control playback of content on a display screen.

36. The method of claim 24, wherein the target device is a television set.

37. The method of claim 29, wherein the target device is operable to control playback of content on a display screen.

38. The method of claim 29, wherein the target device is a television set.

39. The method of claim 30, wherein is operable to control playback of content on a display screen.

40. The method of claim 30, wherein the target device is a television set.

* * * * *